(12) United States Patent
Hayashi

(10) Patent No.: US 8,369,604 B2
(45) Date of Patent: Feb. 5, 2013

(54) POSITION DETECTOR, POSITION DETECTION METHOD, EXPOSURE APPARATUS, AND DEVICE MANUFACTURING METHOD

(75) Inventor: Nozomu Hayashi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 893 days.

(21) Appl. No.: 12/243,408

(22) Filed: Oct. 1, 2008

(65) Prior Publication Data

US 2009/0110264 A1 Apr. 30, 2009

(30) Foreign Application Priority Data

Oct. 31, 2007 (JP) ................................. 2007-283791

(51) Int. Cl.
*G06K 9/00* (2006.01)
(52) U.S. Cl. .......................... 382/151; 382/209; 382/287
(58) Field of Classification Search .......................... None
See application file for complete search history.

(56) References Cited

U.S. PATENT DOCUMENTS

| 5,859,923 A * | 1/1999 | Petry et al. ..................... 382/218 |
| 6,023,320 A | 2/2000 | Kawashima |
| 6,992,766 B2 | 1/2006 | Tanaka et al. |
| 7,130,466 B2 | 10/2006 | Seeber |
| 2006/0103845 A1 | 5/2006 | Tanaka et al. |
| 2007/0014467 A1 * | 1/2007 | Bryll ............................. 382/209 |
| 2007/0071359 A1 * | 3/2007 | Yumoto et al. ................. 382/284 |
| 2007/0127823 A1 * | 6/2007 | Seeber ........................... 382/218 |

FOREIGN PATENT DOCUMENTS

| EP | 1482375 | 12/2004 |
| JP | 2000-269700 A | 9/2000 |
| JP | 2003-338455 | 11/2003 |
| TW | 374940 | 11/1999 |
| TW | 200510956 A | 3/2005 |

* cited by examiner

*Primary Examiner* — Gregory J Toatley
*Assistant Examiner* — Juan D Valentin
(74) *Attorney, Agent, or Firm* — Fitzpatrick, Cella, Harper & Scinto

(57) ABSTRACT

A position detector, which detects the position of a mark formed on a substrate (W), comprises a creating unit (9), a search unit (13), and a correction unit (14). The creating unit (9) creates a template used for identifying a mark to be detected (WM) based on an image including the mark (WM). The search unit (13) searches an image by using the template created by the creating unit (9), and determines whether there is a pseudo pattern, other than the pattern of the mark (WM), whose degree of matching with the template is higher than a reference value. The correction unit (14) corrects the template based on the information of the pseudo pattern when it is determined that there is the pseudo pattern, and creates a corrected template whose degree of matching with the pseudo pattern is lower than the reference value.

9 Claims, 11 Drawing Sheets

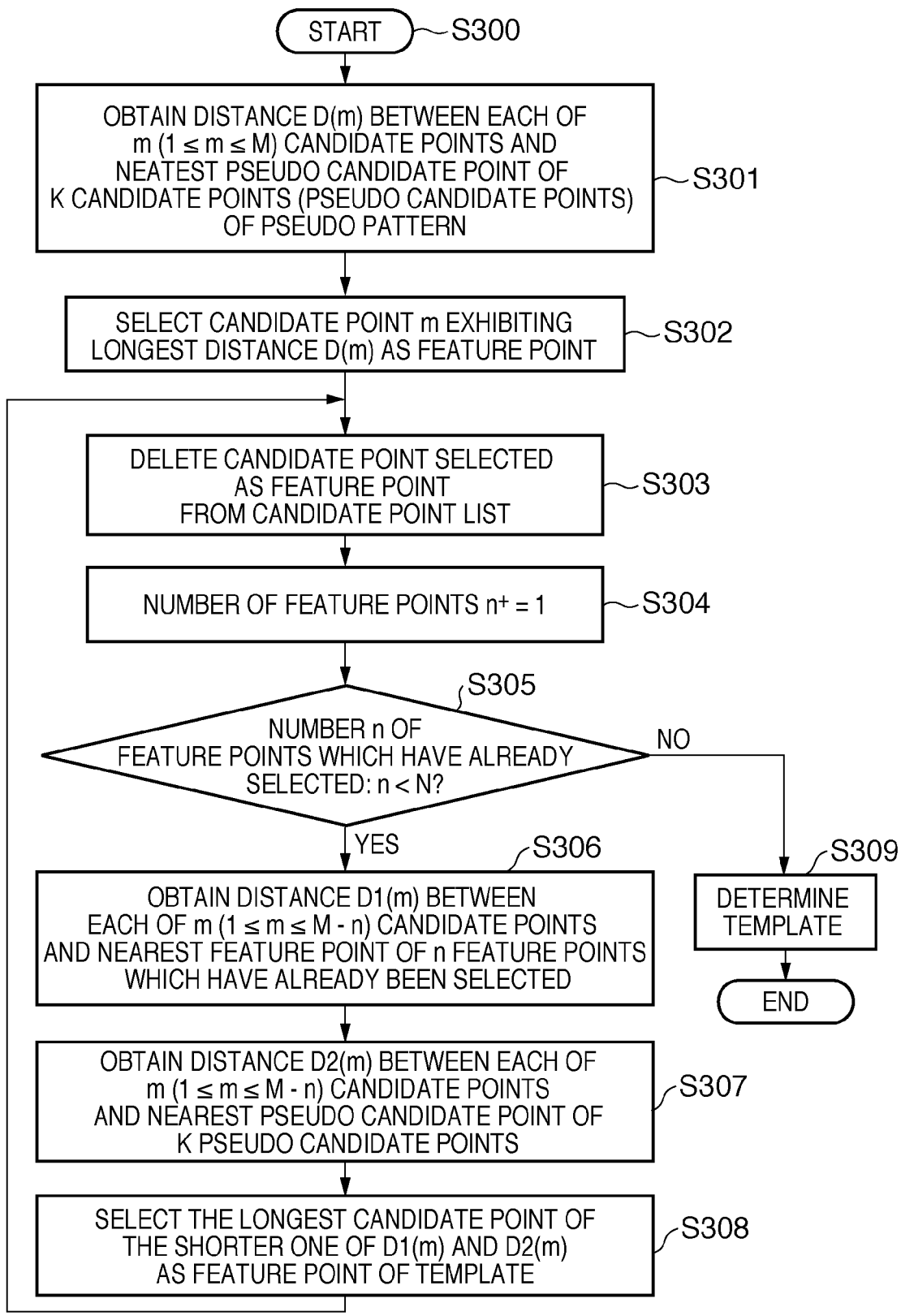

POSITION DETECTOR, POSITION DETECTION METHOD, EXPOSURE APPARATUS, AND DEVICE MANUFACTURING METHOD

BACKGROUND OF THE INVENTION

1. Field of the Invention

The present invention relates to a position detector, a position detection method, an exposure apparatus, and a device manufacturing method.

2. Description of the Related Art

A prior art of a position detector in a semiconductor manufacturing exposure apparatus shown in FIG. 9 will be described.

First of all, a wafer stage 12 is moved to a position where a mark WM on a wafer W can be observed. A pattern (registered pattern) of the mark WM is illuminated with a light beam applied from a mark illumination system 2, which applies non-exposure light, via an imaging optical system 4 and a beam splitter 3. In FIG. 2, a shows an example of the registered pattern. A light beam reflected by the registered pattern reaches the beam splitter 3 again. The light beam is reflected by the beam splitter 3 to form an image of the registered pattern on the image sensing surface of an image sensing unit 6 via an imaging optical system 5. The image sensing unit 6 photoelectrically converts the image of the registered pattern. An A/D conversion unit 7 converts the image of the registered pattern into a two-dimensional digital signal string. An edge position extraction unit 8 differentiates the two-dimensional digital signal string in the x and y directions and extracts coordinates having high differential values like the crosses in b of FIG. 2, as candidate points of template feature points. A template feature point creating unit 9 selects spatially uniformly distributed template feature points like those shown in c of FIG. 2 from the extracted candidate points. The selected template feature points are stored in a template storage unit 10, and are called by a matching unit 11 to be used for template matching processing at the time of measurement of a mark position.

The above conventional position detector is effective for an apparatus which detects template feature points from a registered pattern, registers them, and performs matching processing for the registered template to measure an alignment mark. However, various patterns other than a registered pattern may exist on the wafer W, and some of them may resemble the registered pattern. If the shape of a mark to be detected is known in advance, as disclosed in Japanese Patent Laid-Open No. 2003-338455, a template which prevents erroneous detection of a similar pattern can be also created in consideration of non-edge portions of the mark. Even if template feature points are determined by the conventional position detector, there is a possibility that a pattern other than the mark to be detected will be detected.

SUMMARY OF THE INVENTION

It is an object of the present invention to provide a position detector which can reliably detect a pattern to be detected, even if a pseudo pattern exhibiting a high degree of matching with a template exists near the mark to be detected.

According to a first aspect of the present invention, there is provided a position detector configured to detect a position of a mark formed on a substrate, the detector comprising a creating unit configured to create a template used for identifying a mark to be detected based on an image including the mark, a search unit configured to search an image including the mark to be detected by using the template created by the creating unit, and to determine whether there is a pseudo pattern, other than a pattern of the mark to be detected, whose degree of matching with the template is higher than a reference value, and a correction unit configured to correct the template created by the creating unit based on information of the pseudo pattern when it is determined that there is the pseudo pattern, and to create a corrected template whose degree of matching with the pseudo pattern is lower than the reference value.

According to a second aspect of the present invention, there is provided a method of detecting a position of a mark formed on a substrate, the method comprising the steps of creating a template used for identifying a mark to be detected based on an image including the mark, searching an image including the mark to be detected by using the template created in the step of creating, and determining whether there is a pseudo pattern, other than a pattern of the mark to be detected, whose degree of matching with the template is higher than a reference value, and correcting the template created in the step of creating based on information of the pseudo pattern when it is determined that there is the pseudo pattern, and creating a corrected template whose degree of matching with the pseudo pattern is lower than the reference value.

The present invention can provide a position detector which can reliably detect a pattern to be detected, even if a pseudo pattern exhibiting a high degree of matching with a template exists near the mark to be detected.

Further features of the present invention will become apparent from the following description of exemplary embodiments with reference to the attached drawings.

BRIEF DESCRIPTION OF THE DRAWINGS

FIG. 6A is a flowchart for explaining a process of correcting a template;

DESCRIPTION OF THE EMBODIMENTS

First Embodiment of Position Detector

The first embodiment of a position detector used in an exposure apparatus according to the present invention will be described.

Figure 1:
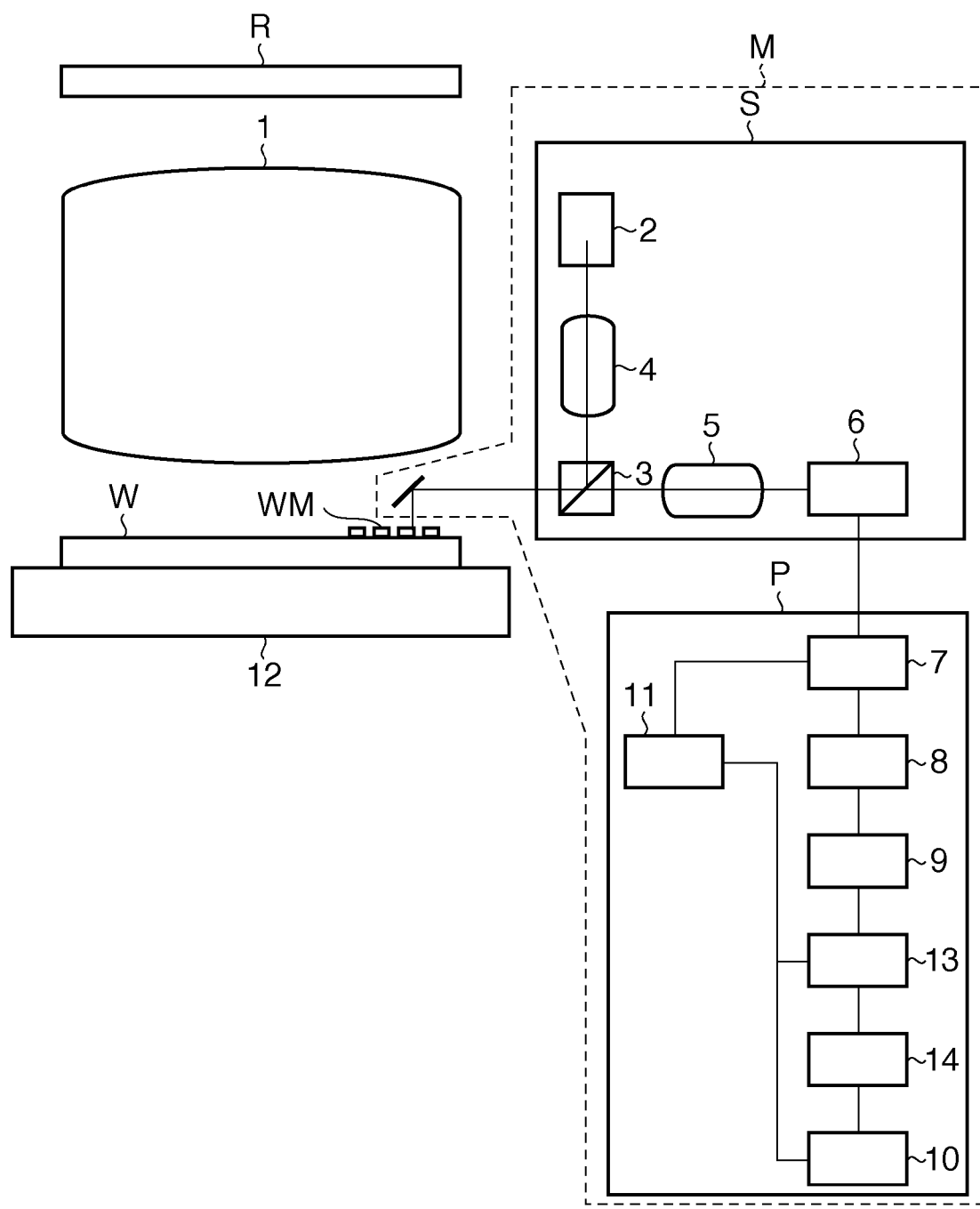
FIG. 1 is a view showing an example of an exposure apparatus including a position detector according to the present invention.

Referring to FIG. 1, reference symbol R denotes a reticle; and W, a wafer which is a substrate to be exposed to light. Reference numeral 1 denotes a projection optical system having the z-axis as an optical axis; and 12, a stage which can three-dimensionally move. Reference symbol M denotes a position detector which detects the position of a mark WM formed on the wafer W as a substrate. The position detector M includes an alignment optical system S comprising a mark illumination system 2, a beam splitter 3, imaging optical systems 4 and 5, an image sensing unit 6, and the like, a processor P, and the like. The processor P includes an A/D conversion unit 7, an edge position extraction unit 8, a template creating unit 9, a template storage unit 10, a matching unit 11, a temporary template search unit 13, and a template correction unit 14.

Figure 2:
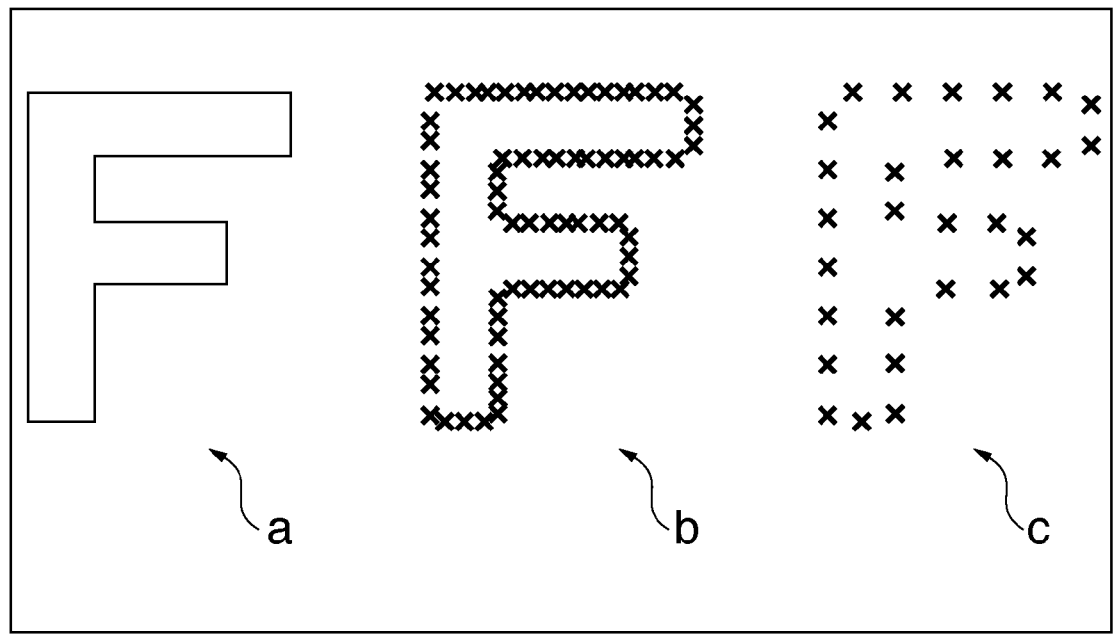
FIG. 2 is a view showing an example of a registered pattern.

First of all, the wafer stage 12 is moved to a position where the pattern (registered pattern) of the mark WM to be detected which is formed on the wafer W can be observed. The mark illumination system 2 applies a light beam as non-exposure light to the registered pattern via the beam splitter 3. In FIG. 2, a shows an example of the registered pattern. The light beam reflected by the registered pattern reaches the beam splitter 3 again. The light beam is reflected by the beam splitter 3 and forms a first image including the registered pattern on the image sensing surface of the image sensing unit 6 via the imaging optical system 5. The image sensing unit 6 photoelectrically converts the first image. The A/D conversion unit 7 then converts the electrical signal of the first image into a two-dimensional digital signal string.

A sequence for determining feature points of a template used to identify a mark to be detected from the two-dimensional digital signal string will be described with reference to FIG. 3.

In step S101, the edge position extraction unit 8 differentiates the two-dimensional digital signal string in the x and y directions and extracts M coordinates exhibiting high differential values as candidate points of feature points of a template, thereby creating a candidate point list. In step S200, the template creating unit 9 determines N (N<M) template feature points from the M extracted candidates.

Figure 4:
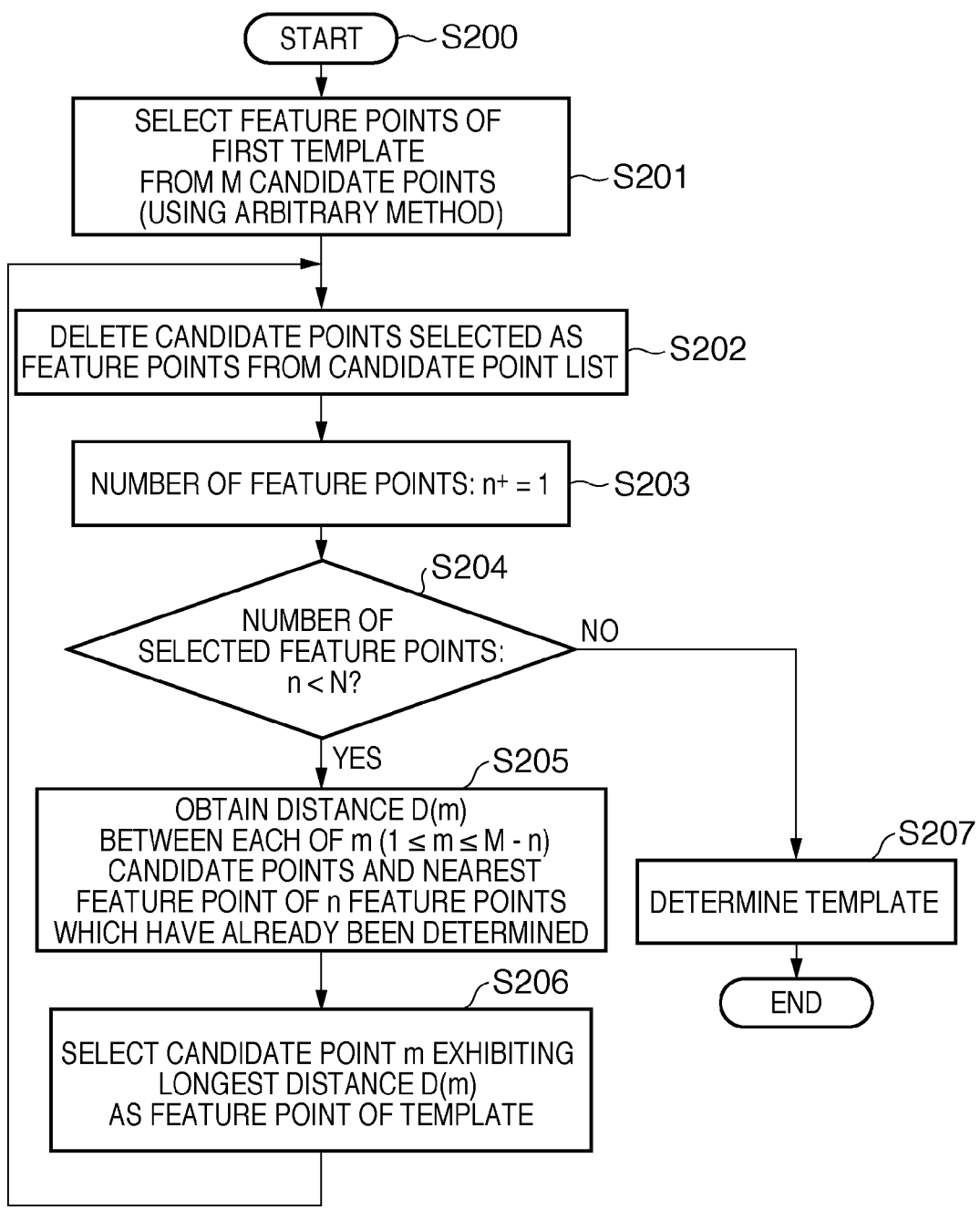
FIG. 4 is a flowchart for explaining an example of a process of creating a template.

A sequence in which the template creating unit 9 creates a template by determining template feature points will be described with reference to FIG. 4. First of all, in step S201, the creating unit 9 selects the first feature point from the M candidate points. As a selection reference, for example, it suffices to use a candidate point having the largest differential value, a candidate point whose differential value is a median, or a candidate point around the center of a registered pattern. However, the present invention is not limited to this. In step S202, the creating unit 9 deletes the candidate point selected as the first feature point from the candidate point list. In step S203, the creating unit 9 increases the number of selected feature points by one. If a number n of selected feature points is less than N, the process advances to step S205. In step S205, the creating unit 9 obtains a distance D(m) between each of m ($1 \leq m \leq M-n$) unselected candidate points and the nearest feature point of the n selected feature points. In step S206, the creating unit 9 newly selects a feature point having the longest distance D(m) as a feature point. The creating unit 9 repeats steps S202 to S206 until the number of selected feature points becomes N.

The template determined by the sequence in step S200 is a temporary template. The template search unit 13 searches the second image including the mark to be detected by using the template created by the creating unit 9, and checks whether the created template is appropriate (S102). The search unit 13 checks the appropriateness of the template by determining whether there is a pattern, other than the pattern (registered pattern) of the mark to be detected, which exhibits a higher degree of matching with the template than a reference value. In this embodiment, the first image used to create the template is used as the second image without any change. If there is no pattern, other than the registered pattern, which exhibits a higher degree of matching with the template than the reference value, that is, there is no pseudo pattern, the temporary template created by the creating unit 9 is used as a proper template (S103, S104).

Figure 5:
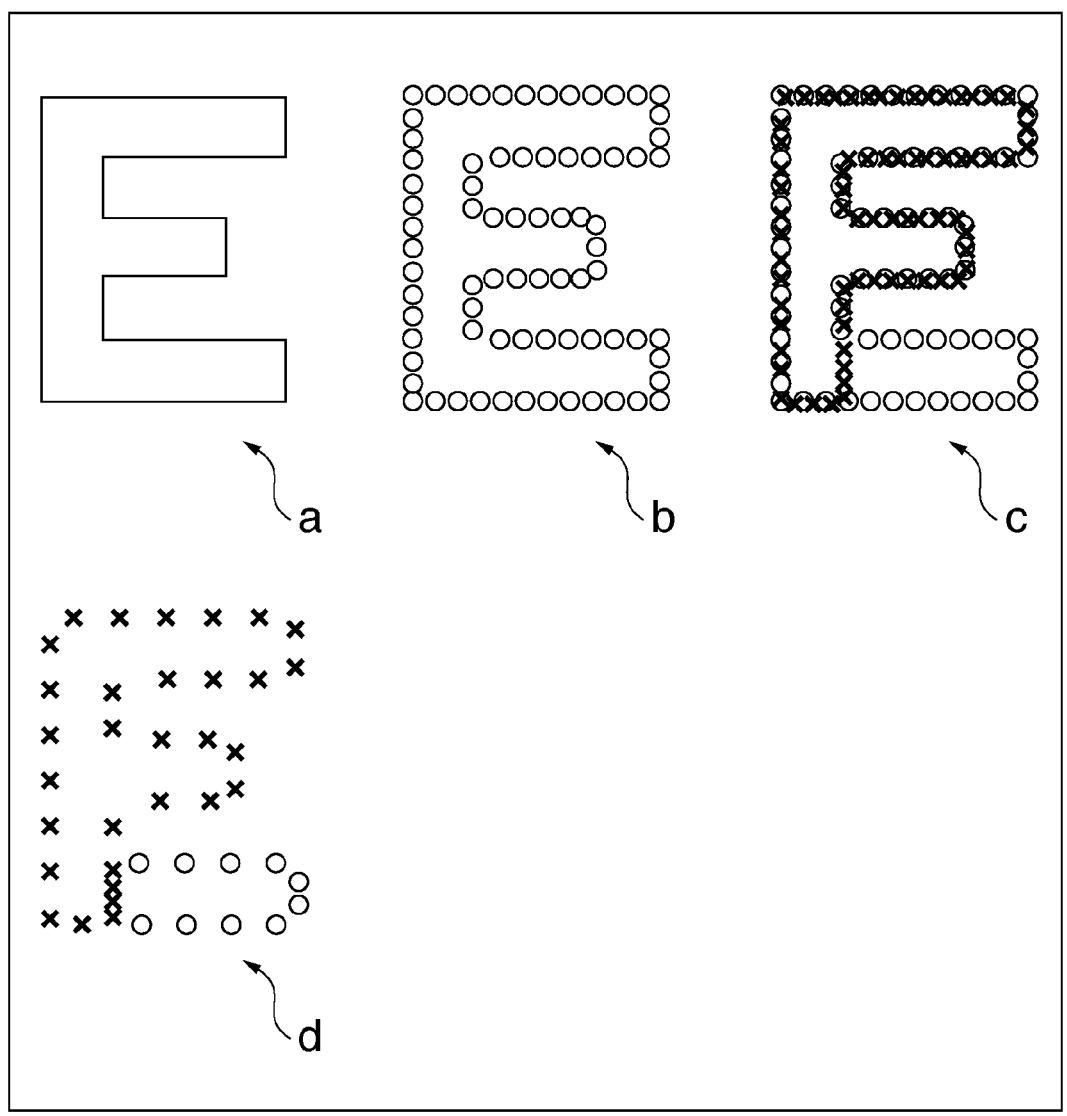
FIG. 5 is a view showing an example of a pseudo pattern.

If the search unit 13 determines in step S103 that there is a pseudo pattern like that shown in a of FIG. 5, the process enters the correction loop for correcting the template, in which the process returns from step S103 to step S102 via steps S105, S106, S107, S300, and S400. In the correction loop, the correction unit 14 corrects the template created by the creating unit 9 so as to reduce the degree of matching between the pseudo pattern and the template to a value lower than the reference value based on the information of the pseudo pattern. As information of a pseudo pattern, the information of a portion existing only in one of the registered pattern and the pseudo pattern can be used.

First of all, the correction unit 14 extracts and stores candidate points of pseudo feature points of the pseudo pattern like the circles in b of FIG. 5 in the same sequence as that in step S101 (S106). If the process had already entered the correction loop and candidate points of pseudo feature points were stored in the past, the correction unit 14 ORs the candidate points (S107). The correction unit 14 extracts feature points of an optimal template from a total of K candidate points (pseudo candidate points) of pseudo feature points obtained by ORing and the M candidate points of feature points (S300, S400).

FIG. 6A is a sequence showing the steps in which the correction unit 14 corrects a template by using feature points which exist in a registered pattern but do not exist in a pseudo pattern. First of all, the correction unit 14 obtains the distance D(m) between each of the m ($1 \leq m \leq M$) candidate points and the nearest pseudo candidate point of the K candidate points (pseudo candidate points) of the pseudo pattern (S301). The correction unit 14 selects the candidate point m exhibiting the longest distance D(m) as the first feature point (S302). The correction unit 14 deletes the candidate point selected as the first feature point from the candidate point list (S303). The correction unit 14 obtains a distance D1(*m*) between each of the m ($1 \leq m \leq M-n$) candidate points and the nearest feature point of the n feature points which have already been selected (S306). The correction unit 14 obtains a distance D2(*m*) between each of the m ($1 \leq m \leq M-n$) candidate points and the nearest pseudo candidate point of the k pseudo candidate points (S307). The correction unit 14 selects the longest candidate point m of the shorter one of D1(*m*) and D2(*m*) as a new feature point (S308). The correction unit 14 repeats steps S303 to S308 until the number of selected feature points of the selected template becomes N. This sequence indicates the step of superimposing the edge points of registered pattern on those of the pseudo pattern as shown in c of FIG. 5 and selecting feature points from the crosses which are not superimposed on circles. Following this sequence can preferentially select edges which do not exist in the pseudo pattern "E" but exist in the registered pattern "F" as feature points of the template like the crosses shown in d of FIG. 5.

Figure 6B:
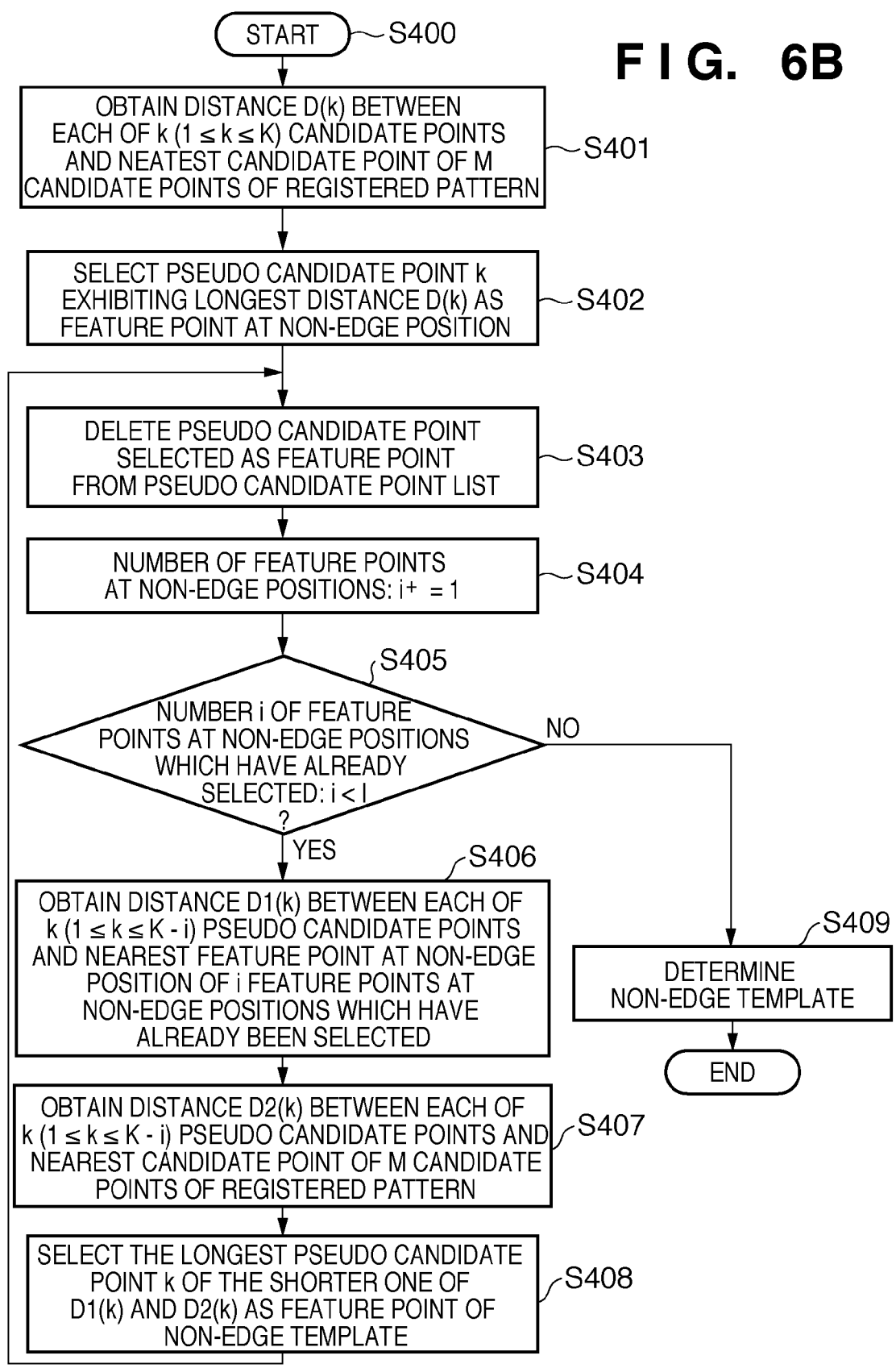
FIG. 6B is a flowchart for explaining a process of correcting a template.

FIG. 6B is a sequence showing the steps in which the correction unit 14 corrects a template by using feature points which do not exist in a registered pattern but exist in a pseudo pattern. The correction unit 14 obtains a distance D(k) between each of k ($1 \leq k \leq K$) pseudo candidate points and the nearest candidate point of M candidate points of the template (S401). The correction unit 14 selects a pseudo candidate point k exhibiting the longest distance D(k) as a feature point (non-edge position feature point) which does not exist at an edge position of the first registered pattern (S402). The correction unit 14 deletes the pseudo candidate point determined as the first non-edge position feature point from the pseudo candidate point list (S403). The correction unit 14 obtains a distance D1($k$) between each of the k (1≦k≦K−i) pseudo candidate points and the nearest non-edge position feature point of the i non-edge position feature points which have already been determined (S406). The correction unit 14 obtains a distance D2($k$) between each of the k (1≦k≦K−i) pseudo candidate points and the nearest candidate point of the M candidate points (S407). The correction unit 14 selects the longest candidate point k of the shorter one of D1($k$) and D2($k$) as a non-edge position feature point (S408). The correction unit 14 repeats steps S403 to S408 until the number of non-edge position feature points becomes I. This sequence indicates the step of superimposing the edge points of the registered pattern on those of the pseudo pattern as shown in c of FIG. 5 and selecting non-edge position feature points from the circles which are not superimposed on crosses. Following this sequence can preferentially select edges which exist in the pseudo pattern "E" but do not exist in the registered pattern "F" as non-edge position feature points like the circles shown in d of FIG. 5.

Non-edge position feature points in a template are effective for the reduction of the degree of matching between the template and a pseudo pattern having non-edge positions of a registered pattern as edge positions, as disclosed in patent referent 1.

Figure 3:
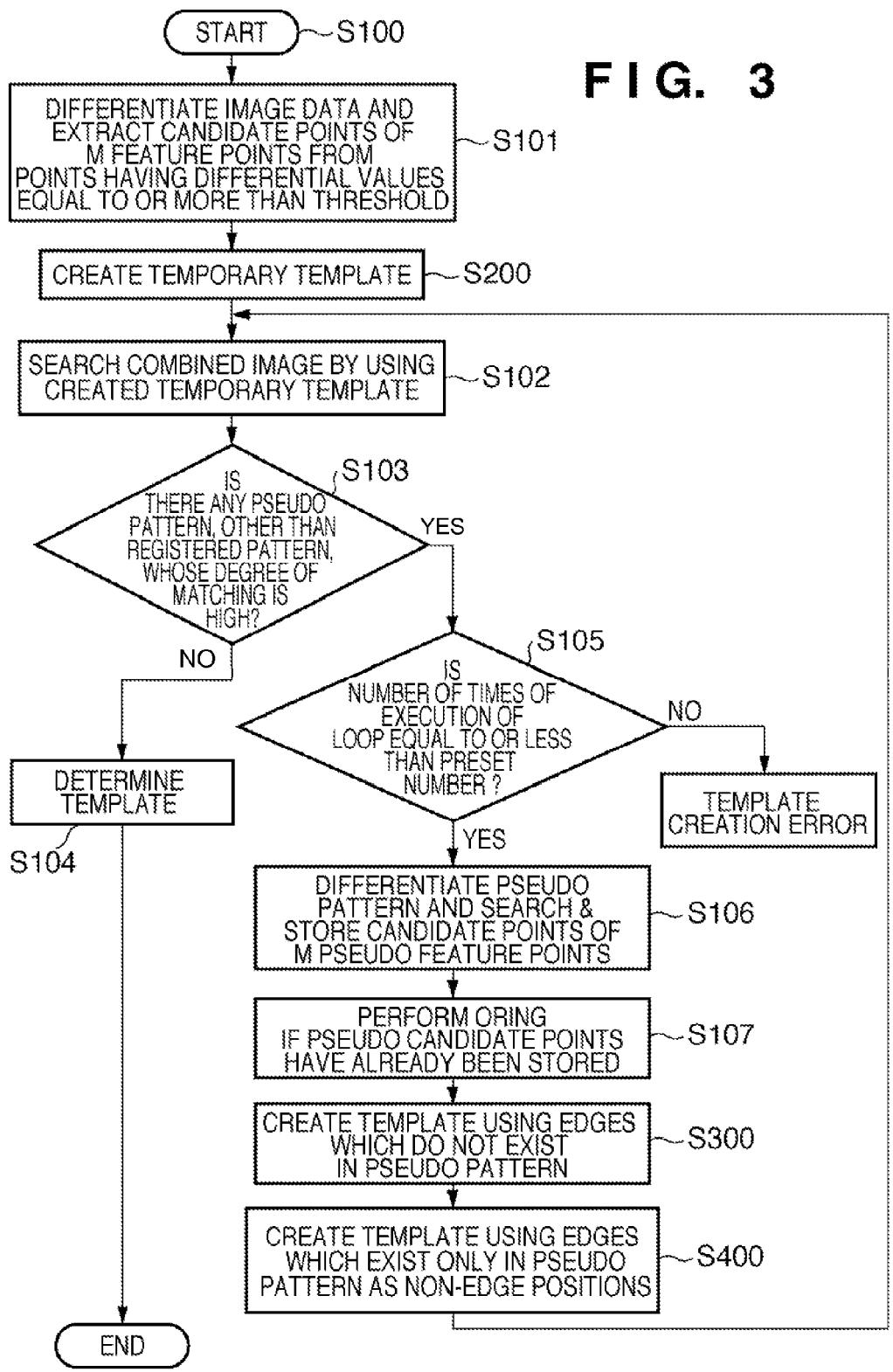
FIG. 3 is a flowchart for explaining an example of a process of creating and correcting a template.

The correction unit 14 repeats the correction loop in which the process returns from step S103 to step S102 via steps S105, S106, S107, S300, and S400 shown in FIG. 3 until there is no pseudo pattern whose degree of matching with the template is higher than the reference value. This can determine a corrected template which allows reliable detection of a mark to be detected. The determined template is stored in the template storage unit 10 and is called from the matching unit 11 to be used for matching processing at the time of detection of a mark position. In this embodiment, a template whose degree of matching with a pseudo pattern is reduced is created in two steps, that is, steps S300 and S400. If, however, a template whose degree of matching with a pseudo pattern is reduced can be created in one of the sequences in steps S300 and S400, there is no need to perform both sequences in steps S300 and S400.

Second Embodiment of Position Detector

The second embodiment of the position detector used in the exposure apparatus according to the present invention will be described.

Figure 7:
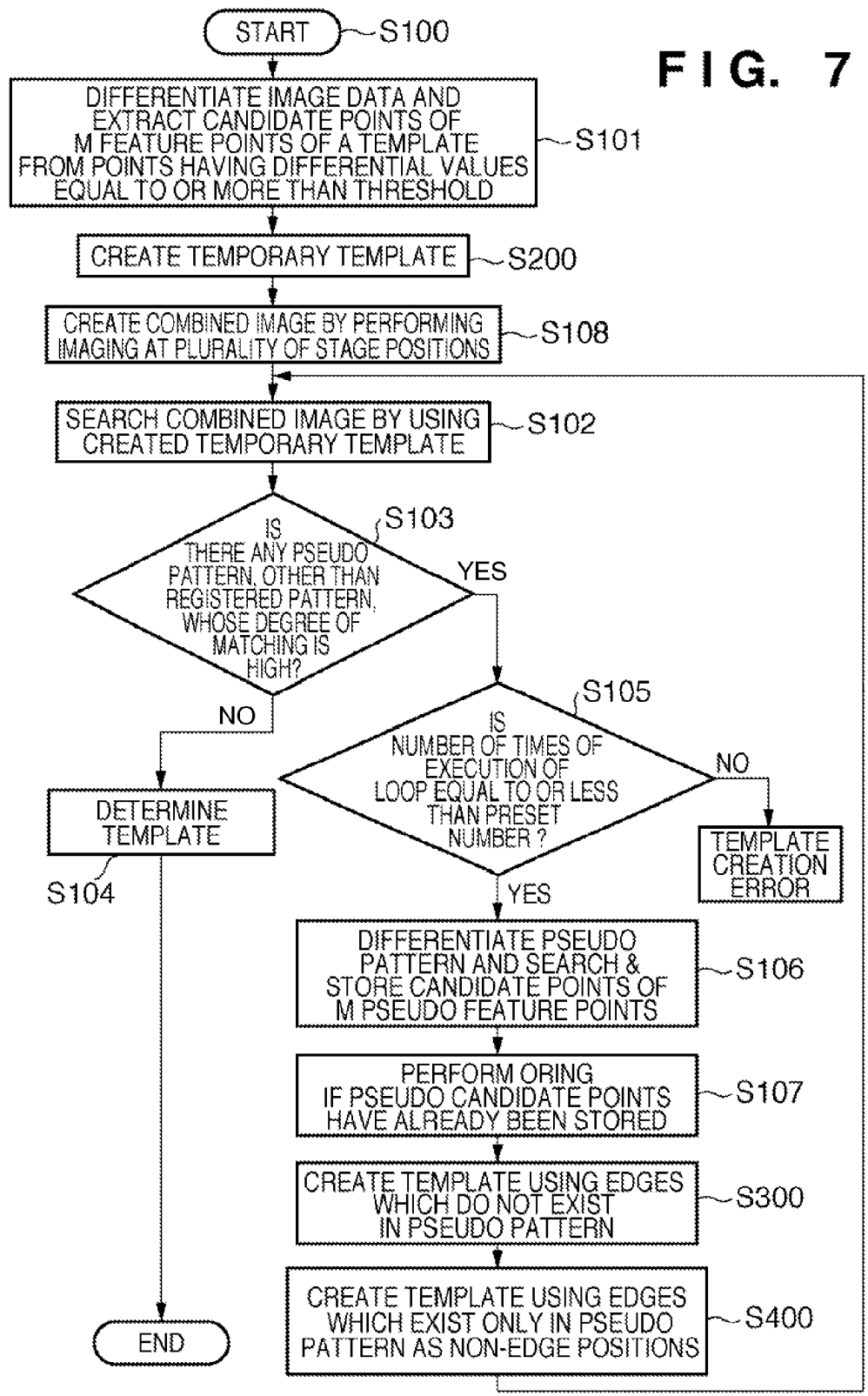
FIG. 7 is a flowchart for explaining another example of the process of creating and correcting a template.

In the first embodiment, the search unit 13 uses, as the second image including the mark to be detected, the first image including the mark to be detected without any change, based on which the creating unit 9 creates a template. When an alignment mark is to be actually measured by the exposure apparatus, it is sufficiently possible that a pseudo pattern different from the image at the time of creation of the template will be imaged due to a wafer position error or the like. A sequence by which a template is created, which prevents detection of a pseudo pattern even at the occurrence of a wafer position error or the like, will be described with reference to FIG. 7.

Figure 8:
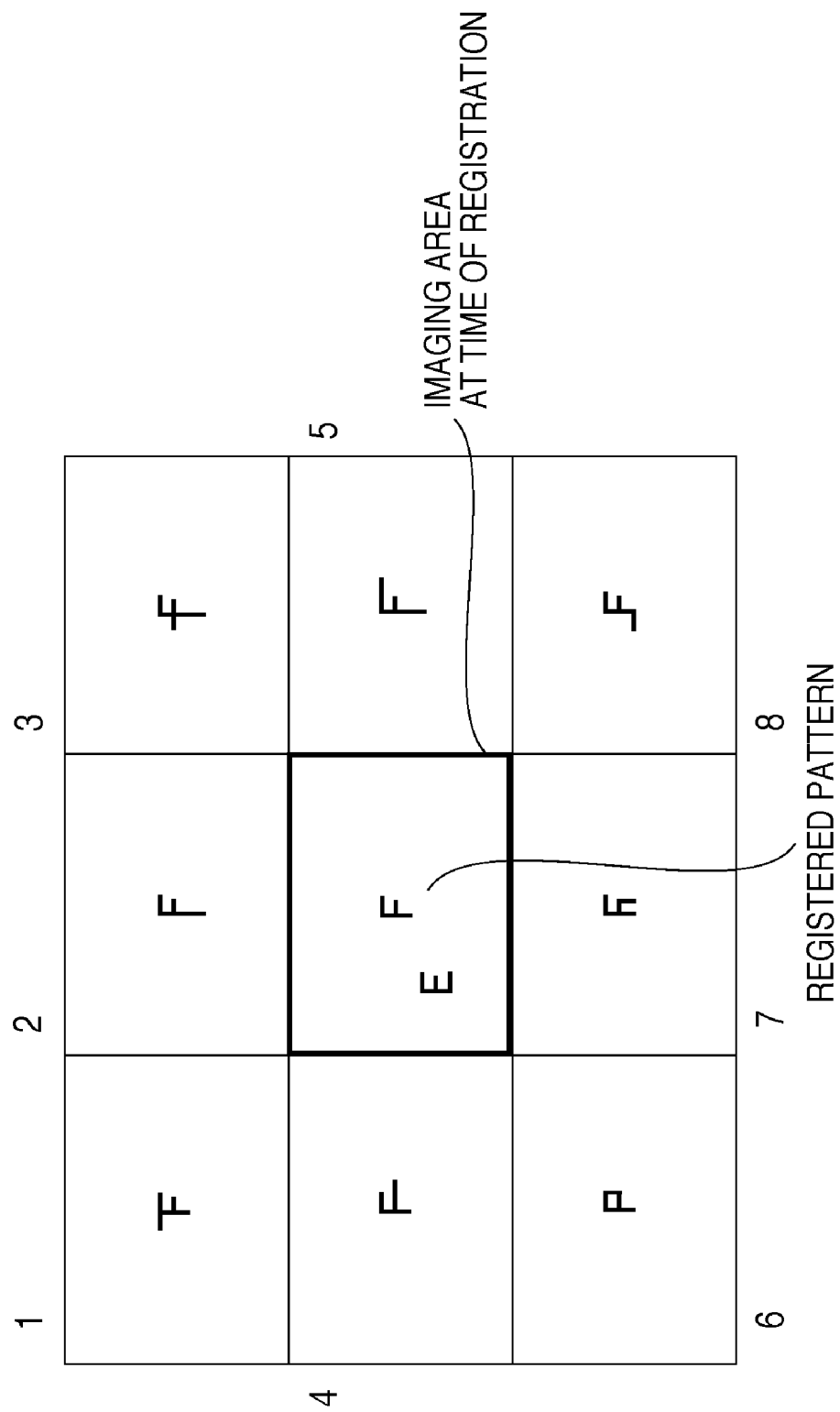
FIG. 8 is a view for explaining a combined image obtained by combining images at a plurality of stage positions.
Figure 9:
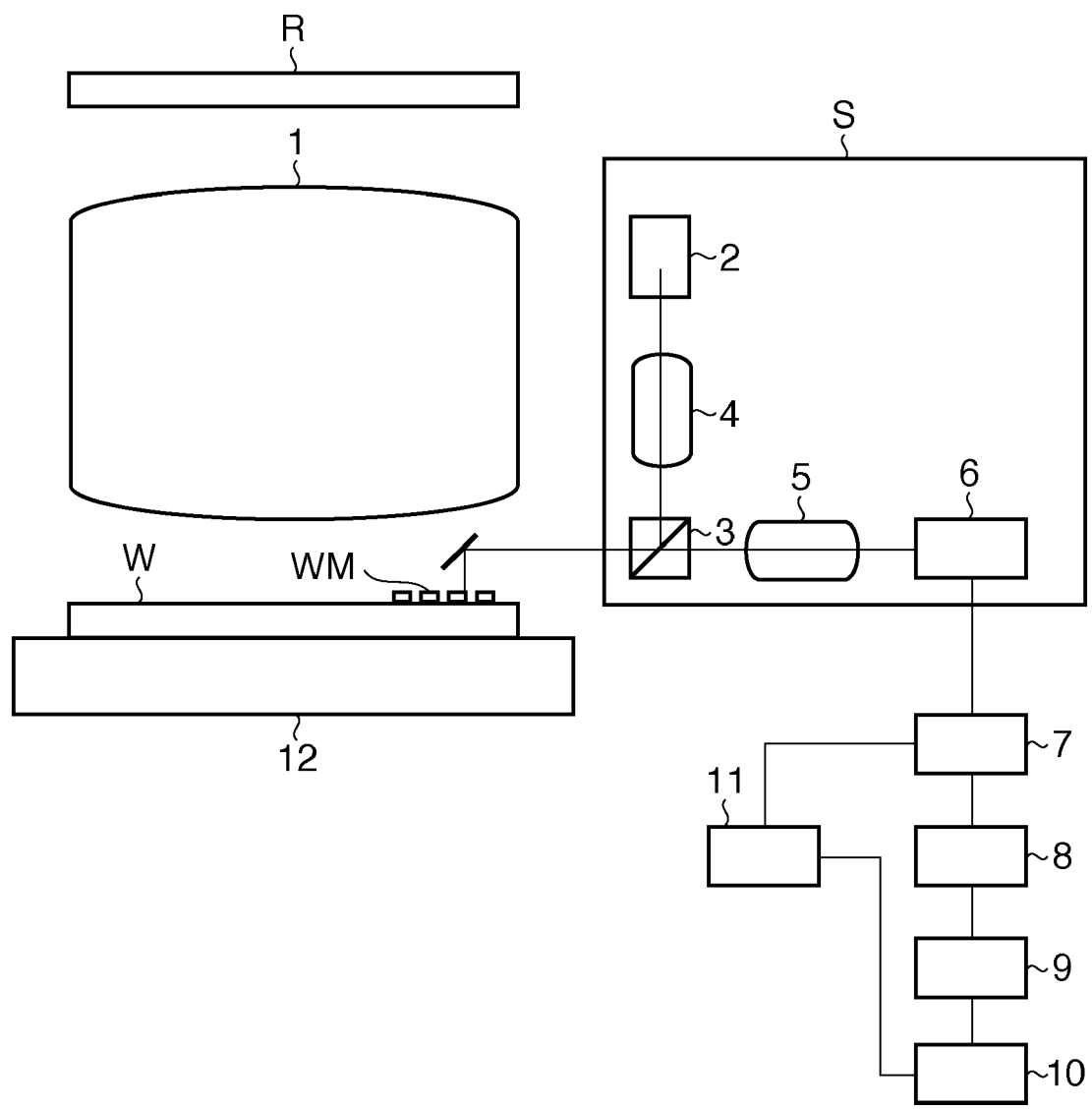
FIG. 9 is a view showing an exposure apparatus including a conventional position detector.

When a temporary template is completed by the same sequence at that in the first embodiment, an image sensing unit 6 performs imaging at eight stage positions centered on the first image including a registered pattern (S108). As shown in FIG. 8, the image sensing unit 6 creates a combined image by combining the first image and the images captured at the eight positions. A search unit 13 then searches the combined image as the second image by using a template as in the first embodiment (S102). A correction unit 14 repeats the correction loop until there is no pseudo pattern, in the combined image, whose degree of matching with the template is higher than a reference value. Searching pseudo patterns in an image in an area wider than that of the first image in this manner makes it possible to create a template which prevents erroneous detection of pseudo patterns even at the occurrence of a wafer position error or the like.

This embodiment also searches pseudo patterns in image areas at eight stage positions centered on the first image including a detection mark. However, if it can be assumed that a wafer position error or the like is large, it suffices to combine images in a wider range and search pseudo patterns. Alternatively, it suffices to repeat a template correction loop for each of images at different stage positions without creating any combined image. In this case, a pseudo pattern may extend over the boundary of images, and hence it is necessary to capture a plurality of images at different stage positions such that imaging range overlap each other.

Embodiment of Exposure Apparatus

Figure 10:
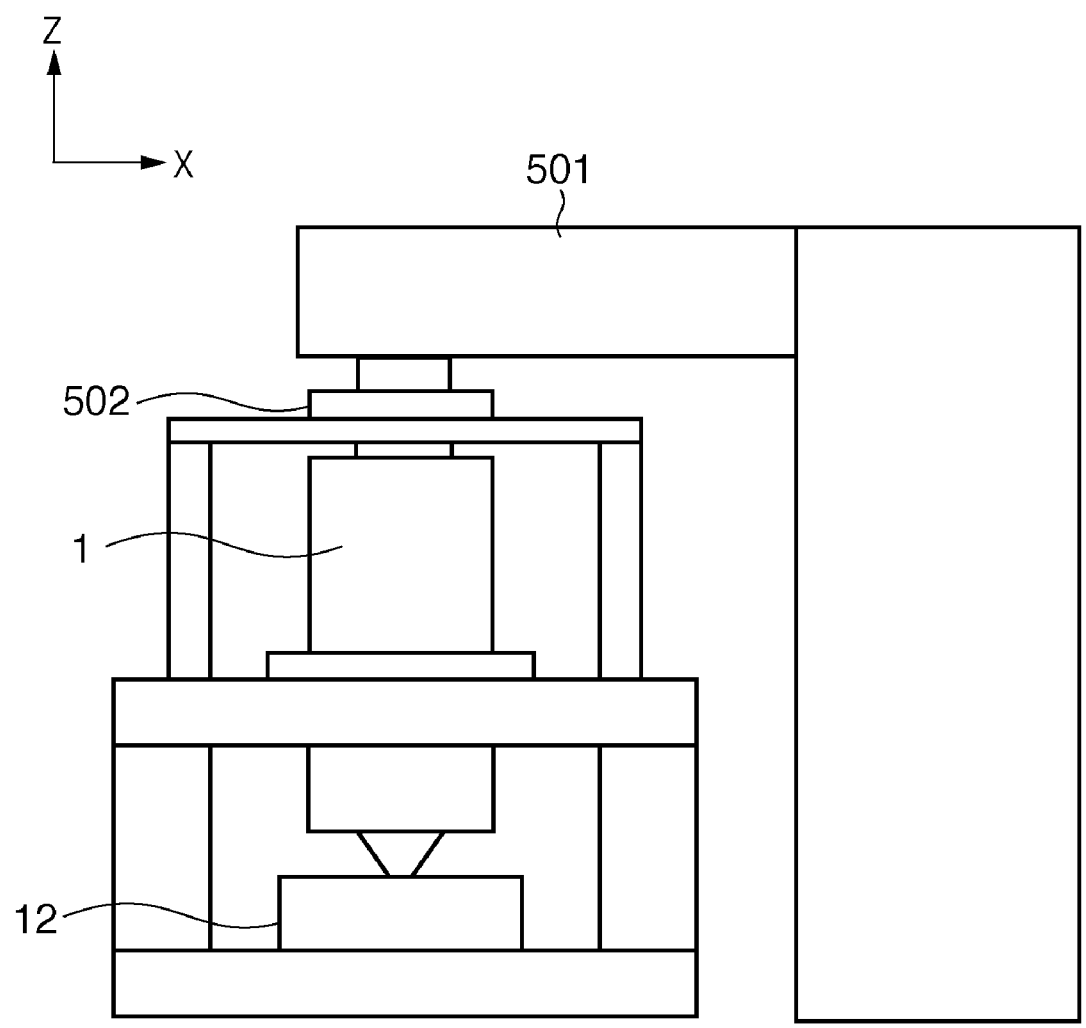
FIG. 10 is a view for explaining an exposure apparatus.

An exemplary exposure apparatus to which the position detector of the present invention is applied will be described below. As shown in FIG. 10, the exposure apparatus has an illumination system unit 501, a reticle stage 502 which mounts a reticle, a projection optical system 1, and a wafer stage 12 which mounts a wafer. The exposure apparatus projects and transfers by exposure a circuit pattern formed on a reticle onto a wafer, and may be of the step & repeat projection exposure scheme or the step & scan projection exposure scheme.

The illumination system unit 501 illuminates a reticle on which a circuit pattern is formed, and has a light source unit and illumination optical system. The light source unit uses, for example, a laser as a light source. The laser can be, for example, an ArF excimer laser with a wavelength of about 193 nm, a KrF excimer laser with a wavelength of about 248 nm, or an $F_2$ excimer laser with a wavelength of about 153 nm. However, the type of laser is not particularly limited to an excimer laser and may be, for example, a YAG laser, and the number of lasers is not particularly limited either. When a laser is used as the light source, an optical system for shaping a parallel light beam from the laser beam source into a desired beam shape, and an optical system for converting a coherent laser beam into an incoherent one are preferably used. Also, the light source which can be used for the light source unit is not particularly limited to a laser, and one or a plurality of mercury lamps or xenon lamps can be used.

The illumination optical system is an optical system which illuminates a mask and includes, for example, a lens, mirror, light integrator, and stop. The projection optical system 1 can be, for example, an optical system having a plurality of lens elements alone, a catadioptric optical system, an optical system having a plurality of lens elements and at least one diffraction optical element such as a kinoform, or an all-mirror type optical system.

The reticle stage 502 and the wafer stage 12 can move by, for example, a linear motor. In the step & scan projection exposure scheme, the stages 502 and 12 move synchronously. An actuator is separately provided to at least one of the wafer stage and the reticle stage to align the reticle pattern onto the wafer.

The above-described exposure apparatus can be used to manufacture micropatterned devices, for example, a semiconductor device such as a semiconductor integrated circuit, a micromachine, and a thin-film magnetic head.

Embodiment of Device Manufacture

A method of manufacturing a device using the above-described exposure apparatus will be exemplified next.

Devices (e.g., a semiconductor integrated circuit device and liquid crystal display device) are manufactured by an exposing step of exposing a substrate to radiant energy using the exposure apparatus according to the above-described embodiment, a developing step of developing the substrate exposed in the exposing step, and other known steps (e.g., etching, resist removal, dicing, bonding, and packaging steps) of processing the substrate developed in the developing step.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-283791, filed Oct. 31, 2007, which is hereby incorporated by reference herein in its entirety.

What is claimed is:

1. A position detector configured to detect a position of a mark formed on a substrate, the detector comprising:
   a creating unit configured to create a template used for identifying a mark to be detected based on an image including the mark;
   a search unit configured to search an image including the mark to be detected by using the template created by the creating unit, and to determine whether there is a pseudo pattern, other than a pattern of the mark to be detected, whose degree of matching with the template is higher than a reference value; and
   a correction unit configured to correct the template created by the creating unit based on information of the pseudo pattern if it is determined that there is the pseudo pattern, so as to obtain a corrected template having a degree of matching with the pseudo pattern lower than the reference value.

2. A detector according to claim 1, wherein the information of the pseudo pattern includes information of a portion existing in only one of a pattern of the mark to be detected and the pseudo pattern.

3. A detector according to claim 2, wherein the information of the pseudo pattern includes information of a portion which exists in a pattern of the mark to be detected but does not exist in the pseudo pattern.

4. A detector according to claim 2, wherein the information of the pseudo pattern includes information of a portion which does not exist in a pattern of the mark to be detected but exists in the pseudo pattern.

5. A detector according to claim 1, wherein an image used by the search unit includes an image used when the creating unit creates a template.

6. A detector according to claim 1, wherein an image used by the search unit includes an image in an area wider than an image used when the creating unit creates a template.

7. A method of detecting a position of a mark formed on a substrate, the method comprising the steps of:
   creating a template used for identifying a mark to be detected based on an image including the mark;
   searching an image including the mark to be detected by using the template created in the step of creating, and determining whether there is a pseudo pattern, other than a pattern of the mark to be detected, whose degree of matching with the template is higher than a reference value; and
   correcting the template created in the step of creating based on information of the pseudo pattern if it is determined that there is the pseudo pattern, and creating a corrected template whose degree of matching with the pseudo pattern is lower than the reference value.

8. An exposure apparatus configured to expose a substrate to radiant energy, the apparatus comprising a position detector,
   wherein the position detector comprises:
   a creating unit configured to create a template used for identifying a mark to be detected based on an image including the mark;
   a search unit configured to search an image including the mark to be detected by using the template created by the creating unit, and to determine whether there is a pseudo pattern, other than a pattern of the mark to be detected, whose degree of matching with the template is higher than a reference value; and
   a correction unit configured to correct the template created by the creating unit based on information of the pseudo pattern if it is determined that there is the pseudo pattern, so as to obtain a corrected template having a degree of matching with the pseudo pattern lower than the reference value.

9. A method of manufacturing a device, the method comprising:
   exposing a substrate to radiant energy using an exposure apparatus;
   developing the exposed substrate; and
   processing the developed substrate to manufacture the device,
   wherein the exposure apparatus comprises a position detector, and
   wherein the position detector comprises:
   a creating unit configured to create a template used for identifying a mark to be detected based on an image including the mark;
   a search unit configured to search an image including the mark to be detected by using the template created by the creating unit, and to determine whether there is a pseudo pattern, other than a pattern of the mark to be detected, whose degree of matching with the template is higher than a reference value; and
   a correction unit configured to correct the template created by the creating unit based on information of the pseudo pattern if it is determined that there is the pseudo pattern, so as to obtain a corrected template having a degree of matching with the pseudo pattern lower than the reference value.

* * * * *